(12) United States Patent
Lee (10) Patent No.: US 10,985,432 B2
(45) Date of Patent: Apr. 20, 2021

(54) RECHARGEABLE BATTERY HAVING TERMINAL

(71) Applicant: Samsung SDI Co., Ltd., Yongin-si (KR)

(72) Inventor: Hye-Ran Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 208 days.

(21) Appl. No.: 14/869,894

(22) Filed: Sep. 29, 2015

(65) Prior Publication Data

US 2016/0141591 A1    May 19, 2016

(30) Foreign Application Priority Data

Nov. 18, 2014   (KR) .................... 10-2014-0161187

(51) Int. Cl.
*H01M 50/552*   (2021.01)
*H01M 50/543*   (2021.01)
(Continued)

(52) U.S. Cl.
CPC ....... *H01M 50/552* (2021.01); *H01M 50/103* (2021.01); *H01M 50/15* (2021.01);
(Continued)

(58) Field of Classification Search
None
See application file for complete search history.

(56) References Cited

U.S. PATENT DOCUMENTS 1,376,932 A * 5/1921 Galloway ............... H01M 2/06
                                                      429/175
1,519,867 A * 12/1924 Marko ................... H01M 2/06
                                                      429/183
(Continued)

FOREIGN PATENT DOCUMENTS

| CN | 101257098 A | 9/2008 |
|---|---|---|
| CN | 101826629 A | 9/2010 |

(Continued)

OTHER PUBLICATIONS

Extended European Search Report dated Jan. 7, 2016 for European Patent Application No. EP 15 104 370.3 which shares priority of Korean Patent Application No. KR 10-2014-0161187 with subject U.S. Appl. No. 14/869,894.

(Continued)

*Primary Examiner* — Ula C Ruddock
*Assistant Examiner* — Tony S Chuo
(74) *Attorney, Agent, or Firm* — Knobbe, Martens, Olson & Bear, LLP (57) ABSTRACT

A rechargeable battery having a terminal is disclosed. In one aspect, the rechargeable battery includes an electrode assembly including a first electrode, a second electrode, and a separator interposed between the first electrode and the second electrode. The battery also includes a case housing the electrode assembly. The case defines a hole at the bottom of the case and an opening at the top of the case. The battery further includes a cap plate connected to the opening in the case and a first terminal bonded to the first electrode and penetrating through the hole so as to protrude beyond the exterior of the case.

9 Claims, 9 Drawing Sheets

(51) Int. Cl.
  *H01M 50/15* (2021.01)
  *H01M 50/103* (2021.01)
  *H01M 50/148* (2021.01)
  *H01M 50/155* (2021.01)
  *H01M 50/169* (2021.01)
  *H01M 50/172* (2021.01)
  *H01M 10/0565* (2010.01)
  *H01M 10/0587* (2010.01)
  *H01M 10/0525* (2010.01)
  *H01M 10/04* (2006.01)

(52) U.S. Cl.
  CPC ....... *H01M 50/154* (2021.01); *H01M 50/155* (2021.01); *H01M 50/169* (2021.01); *H01M 50/172* (2021.01); *H01M 50/543* (2021.01); *H01M 10/0431* (2013.01); *H01M 10/0525* (2013.01); *H01M 10/0565* (2013.01); *H01M 10/0587* (2013.01); *H01M 2220/20* (2013.01); *H01M 2220/30* (2013.01)

(56) References Cited

U.S. PATENT DOCUMENTS

| | | | |
|---|---|---|---|
| 8,025,202 | B2 | 9/2011 | Taniguchi et al. |
| 2001/0018147 | A1 | 8/2001 | Yanai et al. |
| 2010/0159307 | A1 | 6/2010 | Mao et al. |
| 2010/0227215 | A1 | 9/2010 | Cheon et al. |
| 2010/0233519 | A1* | 9/2010 | Cheon ............... H01M 2/34 429/56 |
| 2010/0323234 | A1* | 12/2010 | Kim ............... H01M 2/206 429/158 |
| 2011/0183195 | A1* | 7/2011 | Nngai ............... H01M 2/30 429/181 |
| 2012/0003528 | A1* | 1/2012 | Kusukawa ......... H01M 2/0212 429/179 |
| 2012/0064389 | A1* | 3/2012 | Uh ............... H01M 2/0217 429/163 |
| 2015/0103470 | A1* | 4/2015 | Saya ............... H01G 11/80 361/502 |
| 2016/0126512 | A1* | 5/2016 | Kim ............... H01M 2/08 429/179 |

FOREIGN PATENT DOCUMENTS

| | | |
|---|---|---|
| CN | 102197515 A | 9/2011 |
| CN | 104011931 A | 8/2014 |
| EP | 2 133 937 A1 | 12/2009 |
| JP | 2000-100395 A | 4/2000 |
| JP | 2008-84755 A | 4/2008 |
| JP | 2009-048962 A | 3/2009 |
| KR | 10-2006-0022355 A | 3/2006 |
| KR | 10-2010-0014664 A | 2/2010 |
| KR | 10-2010-0100575 A | 9/2010 |

OTHER PUBLICATIONS

First Chinese Office Action dated Nov. 21, 2018 for Chinese Patent Application No. CN 201510795231.0, which shares priority of Korean Patent Application No. KR 10-2014-0161187 with subject U.S. Appl. No. 14/869,894.

The Second Chinese Office Action dated Jul. 15, 2019 for Chinese Patent Application No. CN 2015100795231.0, which shares priority of Korean Patent Application No. KR 10-2014-0161187 with subject U.S. Appl. No. 14/869,894.

Examination Report issued in European patent application No. 15194369.3, dated Jul. 1, 2020, 4 pp.

European Examination Report dated Jul. 24, 2018 for European Patent Application No. EP 15 194 369.3, which shares priority of Korean Patent Application No. KR 10-2014-0161187 with subject U.S. Appl. No. 14/869,894. No new references are cited in the Examination Report.

\* cited by examiner

RECHARGEABLE BATTERY HAVING TERMINAL

INCORPORATION BY REFERENCE TO ANY PRIORITY APPLICATIONS

This application claims priority to and the benefit of Korean Patent Application No. 10-2014-0161187 filed in the Korean Intellectual Property Office on Nov. 18, 2014, the entire contents of which are incorporated herein by reference.

BACKGROUND

Field

The described technology generally relates to a rechargeable battery having a terminal.

Description of the Related Technology

Rechargeable batteries can be repeatedly charged and discharged in contrast to primary batteries that are incapable of being recharged. Low capacity rechargeable batteries can be used for portable electronic devices such as mobile phones, laptop computers and camcorders. Similarly, high capacity rechargeable batteries are widely used as power sources for driving the motors of hybrid vehicles.

Representative rechargeable batteries include nickel-cadmium (Ni—Cd) batteries, nickel-hydrogen (Ni—MH) batteries, lithium (Li) batteries and lithium ion (Li-ion) batteries. The standard Li-ion rechargeable battery has an operation voltage that is about 3 times greater than that of Ni—Cd and Ni—MH batteries that are widely used in portable electronic devices. Further, due to their high energy density per unit weight, Li-ion rechargeable batteries have been widely used.

SUMMARY OF CERTAIN INVENTIVE ASPECTS

One inventive aspect is a rechargeable battery having high energy density compared to its volume.

Another aspect is a rechargeable battery including: an electrode assembly including a first electrode, a second electrode, and a separator that is interposed between the first electrode and the second electrode; a case that houses the electrode assembly and that has a hole at the bottom; a cap plate that is connected to an opening that is formed in the case; and a first terminal that is bonded to the first electrode and that penetrates the hole to protrude to the outside.

The rechargeable battery can further include a second terminal that penetrates the cap plate and that is electrically connected to the second electrode, an insulating member can be installed between the second terminal and the cap plate, and an uncoated region that is formed in the second electrode can be directly welded to the second terminal.

The first terminal can be welded to the case and the first terminal can be directly bonded to a first electrode uncoated region that is formed in the first electrode.

The first terminal can be welded to a side surface of the first electrode uncoated region and the first terminal can be welded to a lower end portion of the uncoated region.

The first electrode can include an uncoated region in which an active material is not coated, the first terminal can be formed with the uncoated region, and the uncoated region can include a bonding portion that is welded to an upper surface of the bottom of the case, a protruded portion that penetrates the hole to protrude to the outside, and a connection portion that is connected to be inclined from the bonding portion to an upper portion.

An inner circumferential surface of the hole can be formed to be inclined to the bottom and an outer side surface of the first terminal can be formed to be inclined to the bottom.

The case can include a middle case that is formed to have a substantially cuboid shape and a bottom case that is connected to a lower portion of the middle case via an interference fit, the hole can be formed at the bottom of the bottom case, and an inner side surface of the bottom case can be curved in an arc shape to enclose a side surface of the electrode assembly.

Another aspect is a rechargeable battery including: an electrode assembly including a first electrode, a second electrode, and a separator that is interposed between the first electrode and the second electrode; a case that houses the electrode assembly and that is formed to have a substantially cuboid shape; a cap plate that is connected to an opening that is formed in the case; a first terminal having a support wall that is electrically connected to the first electrode, that is insertion connected to the case, and that contacts an inner side wall surface of the case; and a second terminal that is installed to penetrate the cap plate.

A terminal protrusion that is protruded to a lower portion can be formed at the bottom of the first terminal.

Another aspect is a rechargeable battery comprising an electrode assembly including a first electrode, a second electrode, and a separator interposed between the first electrode and the second electrode; a case housing the electrode assembly, wherein the case defines a hole at the bottom of the case and an opening at the top of the case; a cap plate connected to the opening in the case; and a first terminal bonded to the first electrode and penetrating through the hole so as to protrude beyond the exterior of the case.

In exemplary embodiments, the rechargeable battery further comprises a second terminal penetrating through the cap plate and electrically connected to the second electrode. The rechargeable battery can further comprise an insulating member interposed between the second terminal and the cap plate, wherein the second electrode comprises an uncoated region directly welded to the second terminal. The first terminal can be welded to the case. The first electrode can comprise a first electrode uncoated region and the first terminal can be directly bonded to the first electrode uncoated region. The first terminal can be welded to a side surface of the first electrode uncoated region. The first terminal can be welded to a lower end portion of the first electrode uncoated region.

In exemplary embodiments, the first electrode comprises a first electrode uncoated region in which an active material is not coated and wherein the uncoated region forms the first terminal. The uncoated region can comprise a bonding portion welded to an upper surface of the bottom of the case; a protruded portion penetrating through the hole to the exterior of the case; and a connection portion connected to the bonding portion and the first terminal, wherein the connection portion is inclined with respect to the electrode assembly. An inner circumferential surface of the hole can be inclined with respect to the bottom of the case and an outer side surface of the first terminal can be inclined with respect to the bottom of the case.

In exemplary embodiments, the case comprises a main body having a substantially cuboid shape and a bottom case connected a lower portion of the main body, wherein the bottom case is connected to the main body via an interference fit and wherein the hole is formed in the bottom of the bottom case. An inner side surface of the bottom case can be curved to have an arc shape enclosing a side surface of the electrode assembly.

Another aspect is a rechargeable battery comprising an electrode assembly including a first electrode, a second electrode, and a separator interposed between the first electrode and the second electrode; a case housing the electrode assembly and having a substantially cuboid shape, wherein the case defines an opening at one end thereof; a cap plate connected to the opening of the case; a first terminal having a support wall, wherein the support wall: i) is electrically connected to the first electrode, ii) is connected to the case via an interference fit, and iii) contacts an inner side wall surface of the case; and a second terminal penetrating through the cap plate.

In exemplary embodiments, the bottom of the first terminal comprises a terminal protrusion that protrudes from the bottom of the first terminal.

According to at least one exemplary embodiment, since a terminal that penetrates a case is bonded to an electrode assembly, the connection structure of the terminal and the electrode assembly and a connection structure of the terminal and the case are simplified. Accordingly, the volume of the rechargeable battery can be minimized and a greater amount of electrolyte solution can be injected into the case.

DETAILED DESCRIPTION OF CERTAIN INVENTIVE EMBODIMENTS

Rechargeable batteries generally use a lithium-based oxide as a positive electrode active material and a carbon material as a negative electrode active material. These rechargeable batteries can be classified into liquid and polymer electrolyte batteries according to the type of electrolyte employed therein. For example, batteries using a liquid electrolyte are referred to as Li-ion batteries and batteries using a polymer electrolyte are referred to as lithium polymer batteries.

In such rechargeable batteries, it can be important to have a high energy density compared to the battery's volume. One way of improving energy density includes simplifying the elements that are connected to a cap plate of the battery. Further, the cap plate should be insulated from the battery case, have a simple structure and be stably connected to the battery case to prevent damage to the battery when there is an external impact.

Hereinafter, exemplary embodiments will be described in detail with reference to the attached drawings such that the described technology can be easily put into practice by those skilled in the art. As those skilled in the art would realize, the described embodiments may be modified in various different ways, all without departing from the spirit or scope of the described technology. Like reference numerals designate like elements throughout the specification and the drawings.

Figure 1:
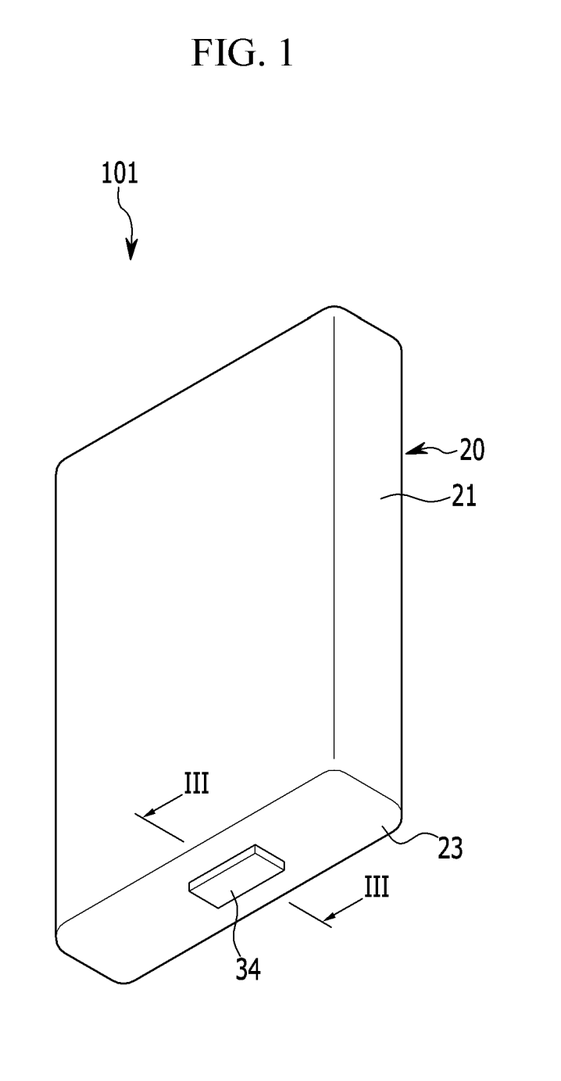
FIG. 1 is a perspective view illustrating a rechargeable battery according to a first exemplary embodiment.
Figure 2:
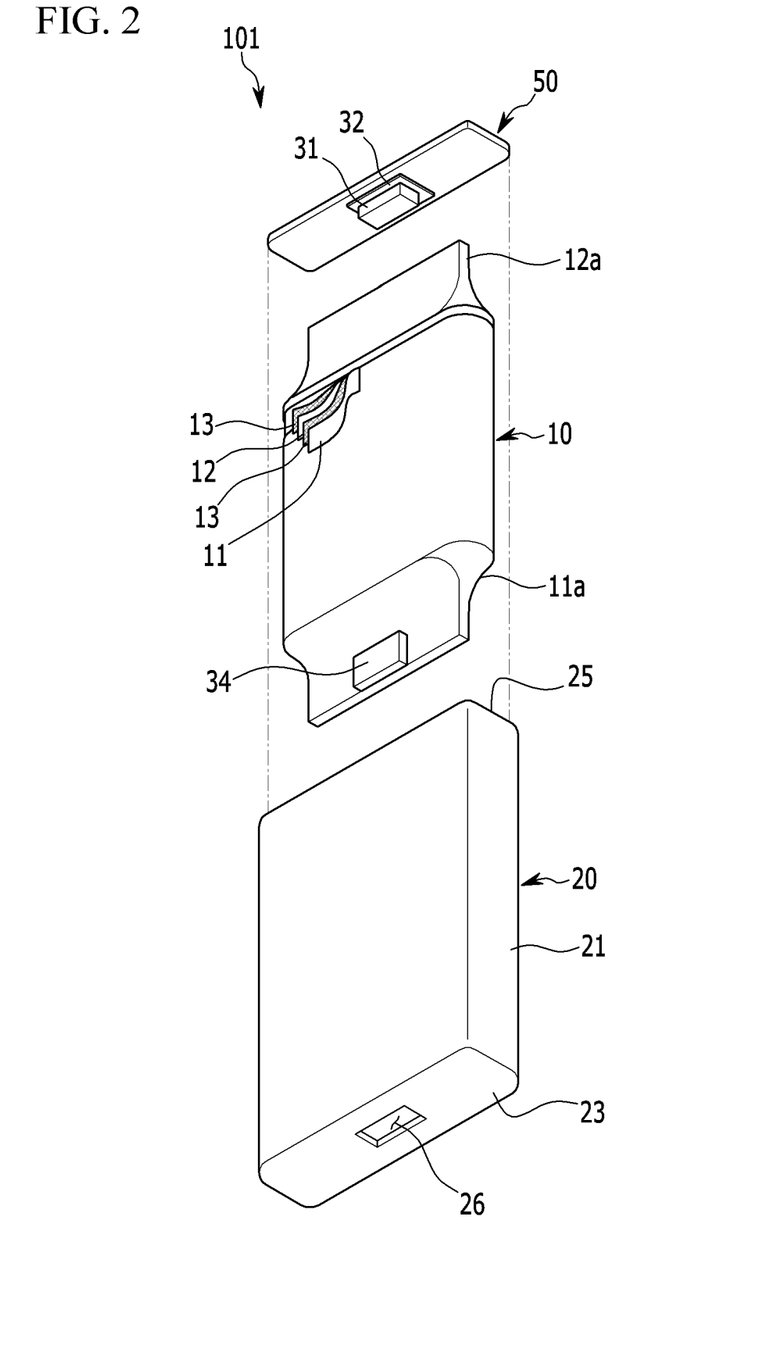
FIG. 2 is an exploded perspective view illustrating the rechargeable battery according to the first exemplary embodiment.

FIG. 1 is a perspective view illustrating a rechargeable battery according to a first exemplary embodiment. FIG. 2 is an exploded perspective view illustrating the rechargeable battery according to the first exemplary embodiment.

Referring to FIGS. 1 and 2, the rechargeable battery 101 includes an electrode assembly 10, a case 20, a cap plate 50, a first terminal 34, and a second terminal 31. Hereinafter, a square battery as illustrated in the drawings will be described, however the described technology is not limited thereto. The described technology may be applied to various rechargeable batteries such as a pouch battery and a lithium polymer battery.

The electrode assembly 10 includes a positive electrode (first electrode) 11, a negative electrode (second electrode) 12, and a separator 13 that is interposed between the positive electrode 11 and the negative electrode 12. The positive electrode 11 includes a positive electrode coating portion formed to have a long connected band shape where an active material is coated and a positive electrode uncoated region 11a where the active material is not coated. The positive electrode uncoated region 11a is located at an end portion of one side of the positive electrode in a length direction thereof.

The negative electrode 12 includes a negative electrode coating portion formed in a long connected band shape where an active material is coated and a negative electrode uncoated region 12a where the active material is not coated. The negative electrode uncoated region 12a is located at an end portion of one side of the negative electrode in a length direction thereof.

The positive and negative electrodes 11 and 12 are spiral-wound with the separator 13, which is an electrical insulator, interposed therebetween to form a jelly roll. However, the described technology is not limited thereto, and the electrode assembly cab be formed to have a structure that is sequentially layered with a separator interposed between the positive and negative electrodes.

Figure 3:
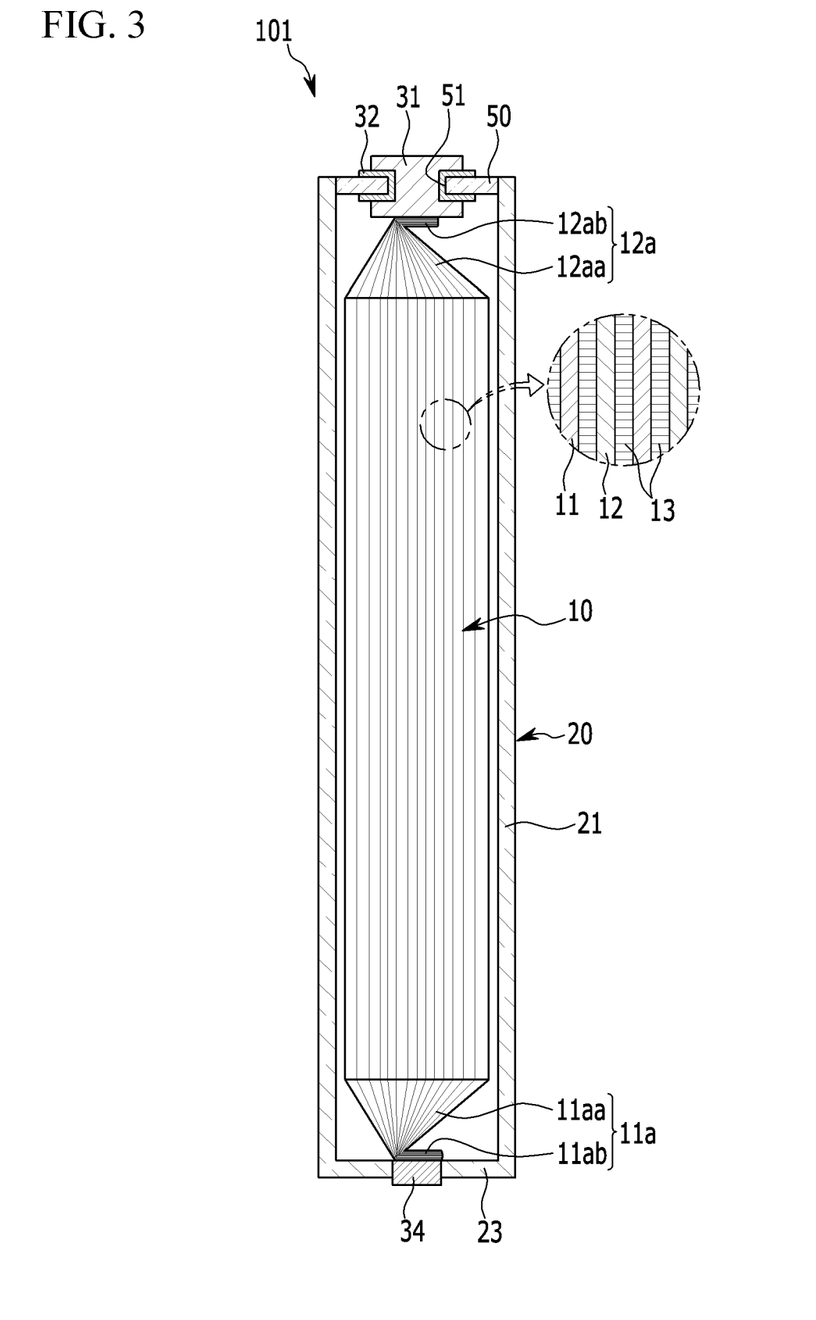
FIG. 3 is a longitudinal cross-sectional view taken along line of FIG. 1.

FIG. 3 is a longitudinal cross-sectional view taken along line III-III of FIG. 1.

Referring to FIGS. 1 to 3, the positive and negative electrode uncoated regions 11a and 12a are located at different end portions of the electrode assembly 10. In the embodiment of FIGS. 1 to 3, the positive electrode uncoated region 11a is located at a lower end portion of the electrode assembly 10 and the negative electrode uncoated region 12a is located at an upper end portion of the electrode assembly 10.

The first terminal 34 is bonded to the positive electrode 11 by welding and the second terminal 31 is bonded to the negative electrode 12 by welding. The first terminal 34 is bonded to the positive electrode uncoated region 11a by welding and penetrates the case 20 to protrude to the exterior. The second terminal 31 is bonded to the negative electrode uncoated region 12a by welding and penetrates the cap plate 50 to protrude to the exterior.

The first terminal 34 is welded to an outer surface of the positive electrode uncoated region 11a and the positive electrode uncoated region 11a is bent so that the first terminal 34 is parallel to a bottom 23 of the case 20. Accordingly, the positive electrode uncoated region 11a includes a tilt connection portion 11aa that is formed to be inclined to an external circumferential surface of the electrode assembly 10 and a bonding portion 11ab that is bent at the tilt connection portion 11aa and welded to the first terminal 34.

The second terminal 31 is welded to an outer surface of the negative electrode uncoated region 12a and the negative electrode uncoated region 12a is bent so that the second terminal 31 is formed to be substantially parallel to the cap plate 50. Accordingly, the negative electrode uncoated region 12a includes a tilt connection portion 12aa that is formed to be inclined to an external circumferential surface of the electrode assembly 10 and a bonding portion 12ab that is bent at the tilt connection portion 12aa and welded to the second terminal 31.

The case 20 is formed in a substantially quadrangular pillar shape and receives the electrode assembly 10 through an opening 25 at an upper end portion of the case 20. The case 20 has an external circumferential surface 21 and the bottom 23 that is formed at a lower end portion of the case 20 and connected to the external circumferential surface 21. A hole 26 is formed at the center of the bottom 23 of the case 20, and the first terminal 34 is inserted into the hole 26. The first terminal 34 is bonded to the case 20 by welding after being inserted into the hole 26. Accordingly, the case 20 is positively charged.

The second terminal 31 is fixedly installed in the cap plate 50 through an insulating member 32 and the insulating member 32 is installed between the cap plate 50 and the second terminal 31 to electrically insulate the second terminal 31 from the cap plate 50. The negative electrode uncoated region 12a is directly welded to a lower surface of the second terminal 31. The second terminal 31 is installed to penetrate the cap plate 50 and pressed to form a rivet form having its upper and lower end spread.

As described above, according to the at least one embodiment, since the first terminal 34 directly connects the electrode assembly 10 and the case 20, the structure thereof is simplified compared to the standard rechargeable battery and thus the production cost thereof can be reduced. Additionally, the manufacturing process for the rechargeable battery according to at least one embodiment is simplified and thus productivity can be improved. Further, since the second terminal 31 is directly welded to the negative electrode uncoated region 12a, the structure thereof can be further simplified.

Figure 4:
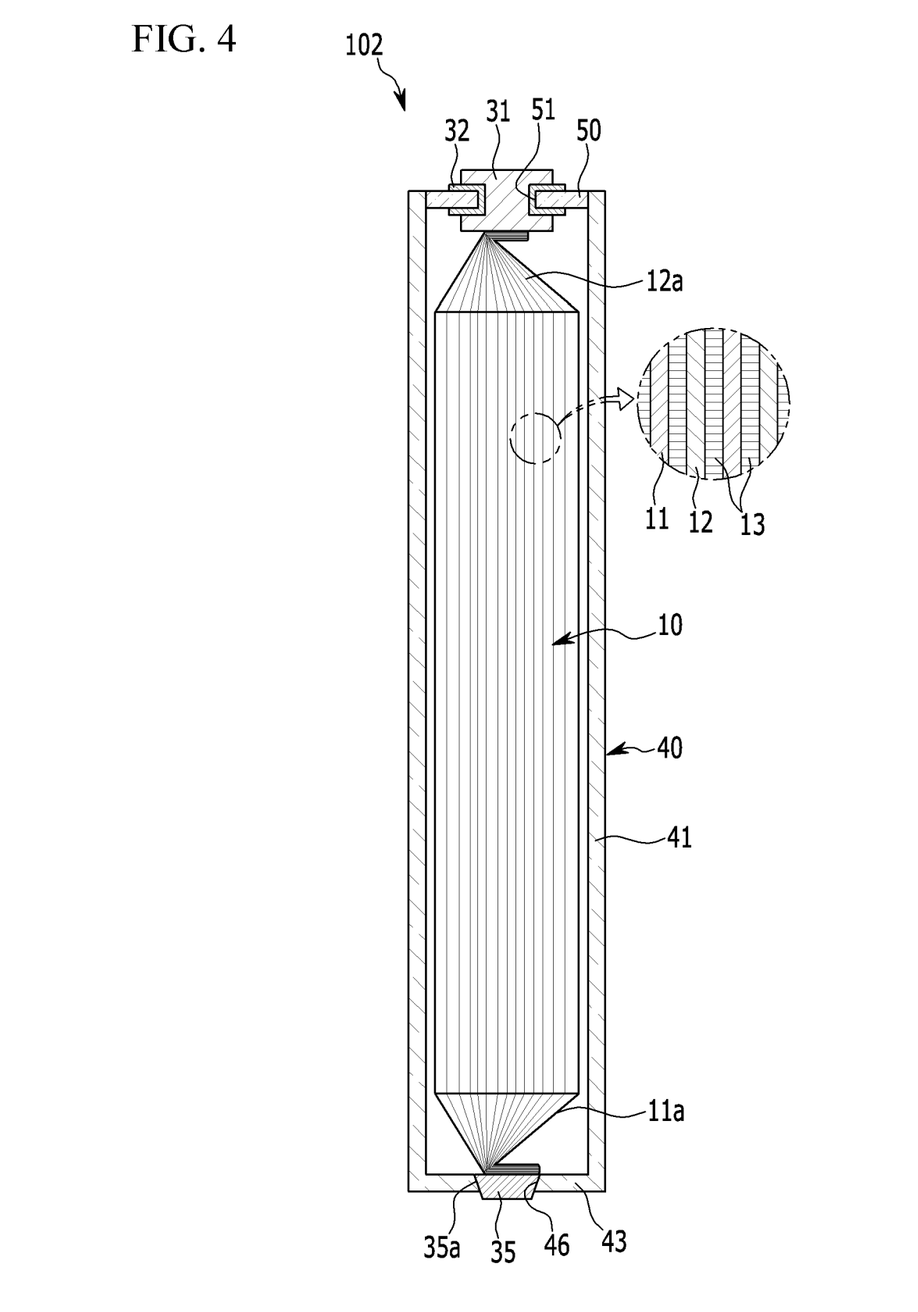
FIG. 4 is a longitudinal cross-sectional view illustrating a rechargeable battery according to a second exemplary embodiment.

FIG. 4 is a longitudinal cross-sectional view illustrating a rechargeable battery according to a second exemplary embodiment.

Referring to FIG. 4, the rechargeable battery 102 has substantially the same structure as that of the rechargeable battery according to the first exemplary embodiment, except for the structure of the first terminal 35 and the case 40, and thus descriptions of the structures that are substantially the same as the first embodiment will be omitted.

The rechargeable battery 102 according to the second exemplary embodiment includes an electrode assembly 10, a case 40, a cap plate 50, a first terminal 35, and a second terminal 31.

The first terminal 35 is bonded to a positive electrode 11 by welding and the second terminal 31 is bonded to a negative electrode 12 by welding. The first terminal 35 is bonded to a positive electrode uncoated region 11a by welding and penetrates the case 40 to protrude to the exterior. The second terminal 31 is bonded to a negative electrode uncoated region 12a by welding and penetrates the cap plate 50 to protrude to the exterior.

An opening is formed at an upper end portion of the case 40 to house the electrode assembly 10 and the case 40 is formed to have a substantially quadrangular pillar shape. The case 40 has an external circumferential surface 41 and a bottom 43 that is formed at a lower end portion of the case 40 and is connected to the external circumferential surface 41. A hole 46 is formed at the center of the bottom 43 and the first terminal 35 is inserted into the hole 46.

The hole 46 is formed to have a quadrangle transverse cross-section and an inner circumferential surface of the hole 46 is inclined with respect to the bottom 43 of the case 40. An inner circumferential surface of the hole 46 is formed to be inclined such that the surface of the hole 46 adjacent to the exterior of the case is closer to the center of the hole 46. An outer side surface 35a of the first terminal 35 is formed to be inclined with respect to the bottom 43 of the case 40 and the outer side surface 35a of the first terminal 35 is formed to be substantially parallel to the inner circumferential surface of the hole 46.

Accordingly, the first terminal 35 can be easily inserted into the hole 46 and the contact area between the first terminal 35 and the case 40 can be increased.

Figure 5:
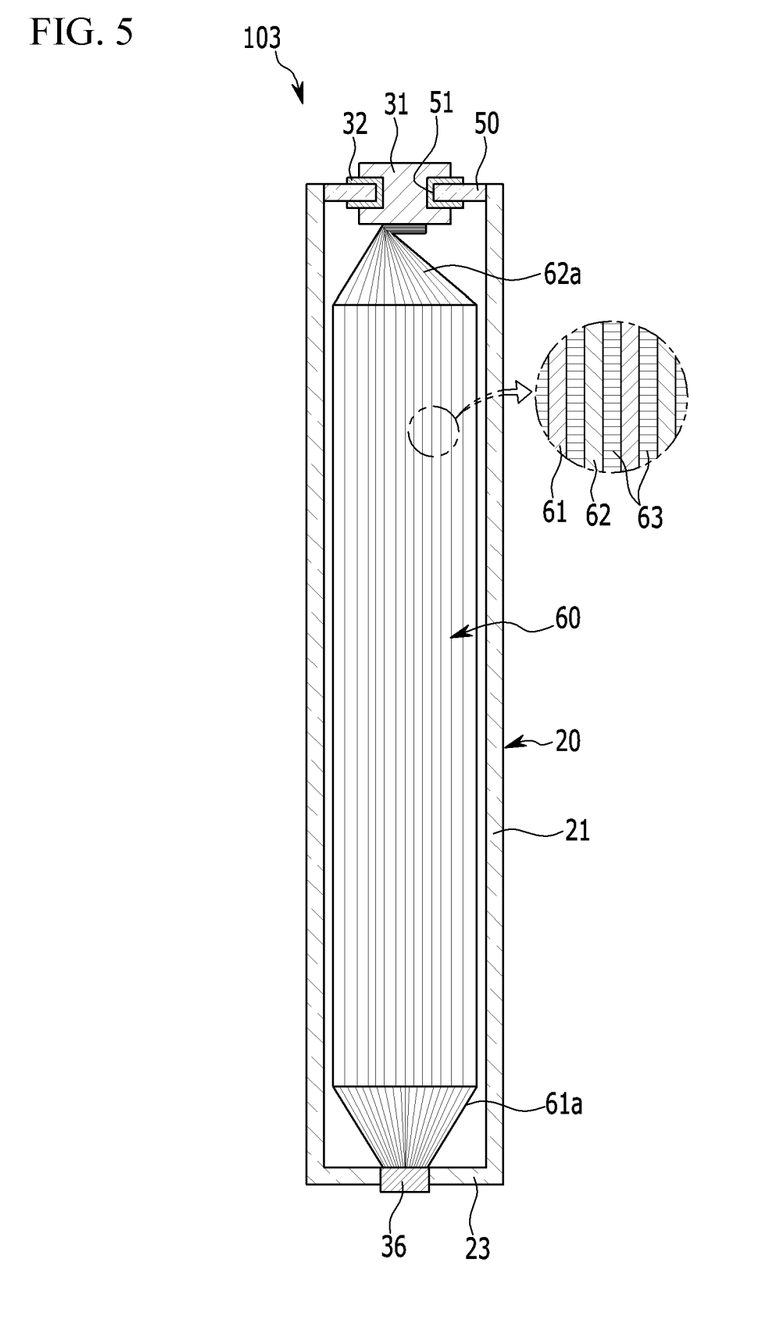
FIG. 5 is a longitudinal cross-sectional view illustrating a rechargeable battery according to a third exemplary embodiment.

FIG. 5 is a longitudinal cross-sectional view illustrating a rechargeable battery according to a third exemplary embodiment.

Referring to FIG. 5, the rechargeable battery 103 according to the third exemplary embodiment has substantially the same structure as that of the rechargeable battery according to the first exemplary embodiment, except for the bonding structure of a first terminal 36 and an electrode assembly 60, and thus descriptions of the structures that are substantially the same as the first embodiment will be omitted.

The rechargeable battery 103 according to the third exemplary embodiment includes an electrode assembly 60, a case 20, a cap plate 50, a first terminal 36, and a second terminal 31. The electrode assembly 60 includes a positive electrode 61, a negative electrode 62, and a separator 63 that is interposed between the positive electrode 61 and the negative electrode 62. The positive electrode 61 includes a positive electrode coating portion where an active material is coated and a positive electrode uncoated region 61a where an active material is not coated. Further, the negative electrode 62 includes a negative electrode coating portion where an active material is coated and a negative electrode uncoated region 62a where an active material is not coated.

The first terminal 36 is bonded to the positive electrode 61 by welding and the second terminal 31 is bonded to the negative electrode 62 by welding. The first terminal 36 is bonded to the positive electrode uncoated region 61a by welding and penetrates the case 20 to protrude to the exterior. The second terminal 31 is bonded to the negative electrode uncoated region 62a by welding and penetrates the cap plate 50 to protrude to the exterior.

The first terminal 36 is welded to a lower end portion of the positive electrode uncoated region 61a and the first terminal 36 can be bonded to the positive electrode uncoated region 61a by ultrasonic welding. The first terminal 36 penetrates a bottom 23 of the case 20 to protrude to the exterior. The second terminal 31 is welded to an outer surface of a negative electrode uncoated region 62a and the negative electrode uncoated region 62a is bent so that the second terminal 31 is substantially parallel to the cap plate 50.

Figure 6:
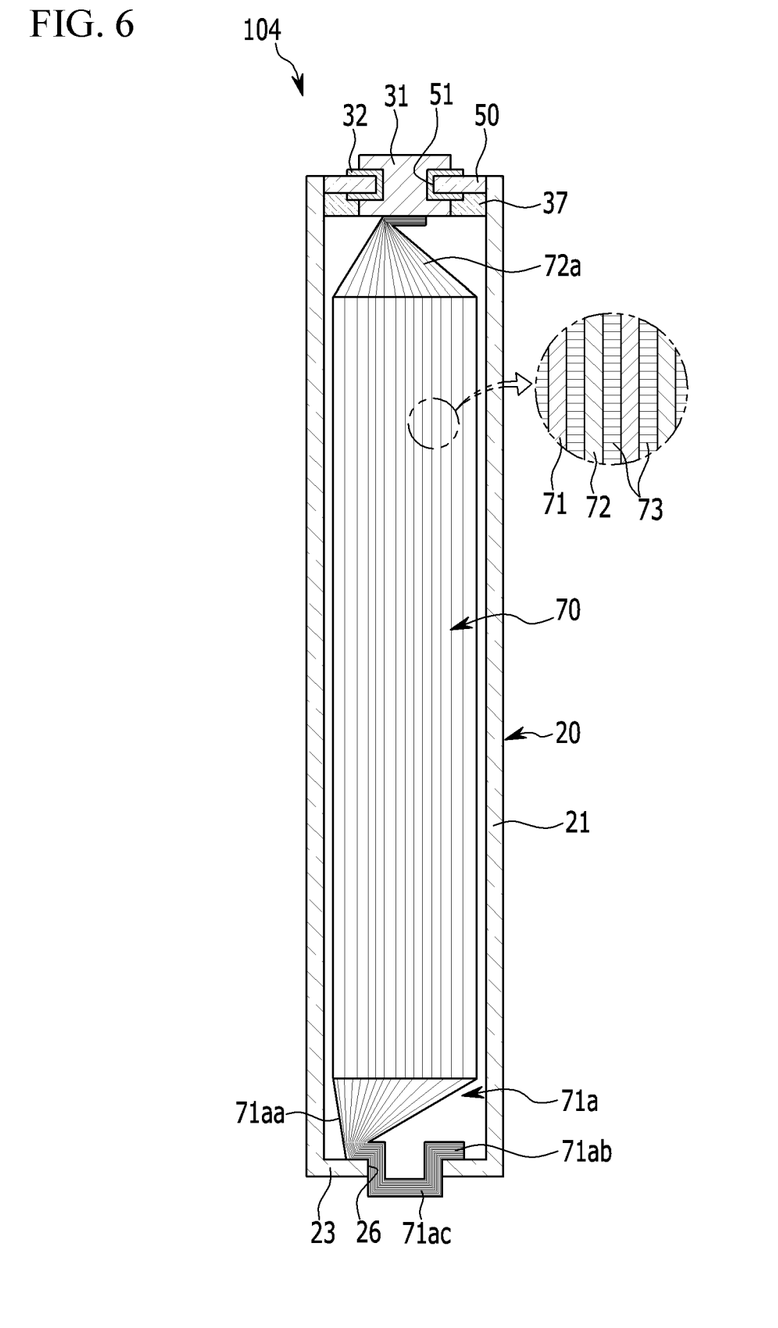
FIG. 6 is a longitudinal cross-sectional view illustrating a rechargeable battery according to a fourth exemplary embodiment.

FIG. 6 is a longitudinal cross-sectional view illustrating a rechargeable battery according to a fourth exemplary embodiment.

Referring to FIG. 6, the rechargeable battery 104 according to the fourth exemplary embodiment is formed with substantially the same structure as that of the rechargeable battery according to the first exemplary embodiment, except for the structure of a first terminal and an electrode assembly, and thus descriptions of the structures that are substantially the same as the first embodiment will be omitted.

The rechargeable battery 104 according to the fourth exemplary embodiment includes an electrode assembly 70, a case 20, a cap plate 50, and a second terminal 31. The electrode assembly 70 includes a positive electrode 71, a negative electrode 72, and a separator 73. The positive electrode 71 includes a positive electrode coating portion in which an active material is coated and a positive electrode uncoated region 71a in which an active material is not coated. Further, the negative electrode 72 includes a negative electrode coating portion in which an active material is coated and a negative electrode uncoated region 72a in which an active material is not coated.

The second terminal 31 is bonded to the negative electrode uncoated region 72a by welding and penetrates the cap plate 50 to protrude to the exterior. An insulating member 32 for electrically insulating the cap plate 50 from the second terminal 31 is installed therebetween. Further, an insulating plate 37 is installed in a lower portion of the cap plate 50, the insulating plate 37 is formed as a substantially quadrangular plate, and a lower portion of the second terminal 31 is inserted into the insulating plate 37. In this way, when the insulating plate 37 is installed, the negative electrode uncoated region 72a can be prevented from contacting the cap plate 50.

An opening is formed to house the electrode assembly 70 at an upper end portion of the case 20 and the case 20 is formed to have a substantially quadrangular pillar shape. The case 20 has an external circumferential surface 21 and a bottom 23 that is formed in a lower end portion of the case 20 and that is connected to the external circumferential surface 21. A hole 26 is formed at the center of the bottom 23 of the case 20 and the positive electrode uncoated region 71a is inserted into the hole 26.

The positive electrode uncoated region 71a is formed to be longer than the negative electrode uncoated region 72a. The positive electrode uncoated region 71a includes a fixing portion 71ab that is welded to the bottom 23 of the case 20, a terminal portion 71ac that is bent at the fixing portion 71ab to protrude to the exterior, and a tilt connection portion 71aa that is connected to the fixing portion 71ab and that is inclined with respect to an external circumferential surface of the electrode assembly 70. In the fourth exemplary embodiment, the terminal portion 71ac functions as a first terminal. Layered uncoated regions are welded to form the terminal portion 71ac and the terminal portion 71ac penetrates the hole 26 to protrude to the exterior.

As described above, according to at least one exemplary embodiment, since the positive electrode uncoated region 71a forms a first terminal, a manufacturing process thereof can be simplified and productivity can be improved.

Figure 7:
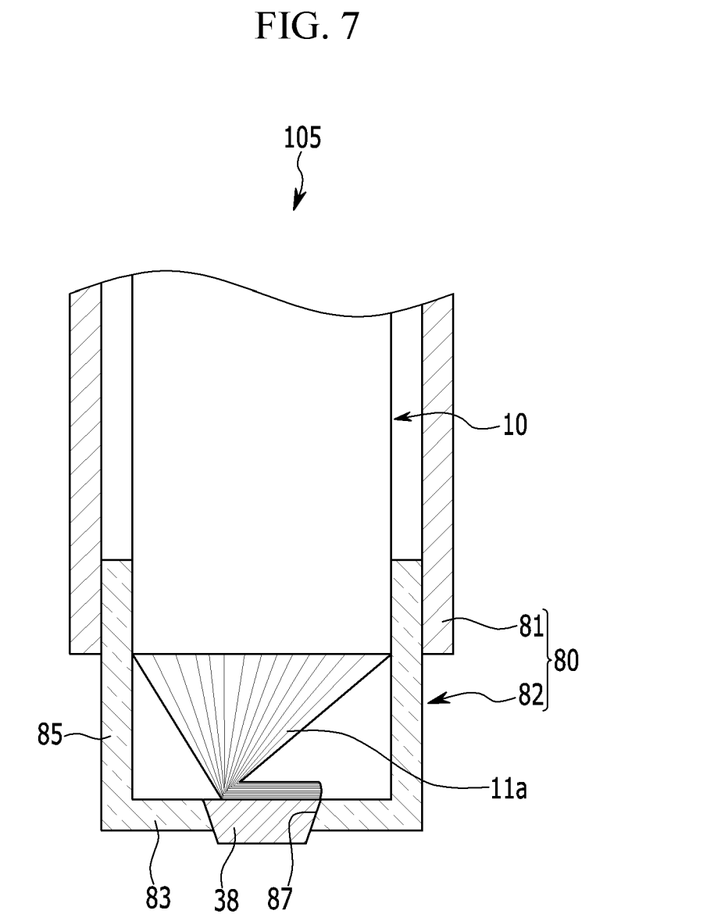
FIG. 7 is a longitudinal cross-sectional view illustrating a portion of a rechargeable battery according to a fifth exemplary embodiment.
Figure 8:
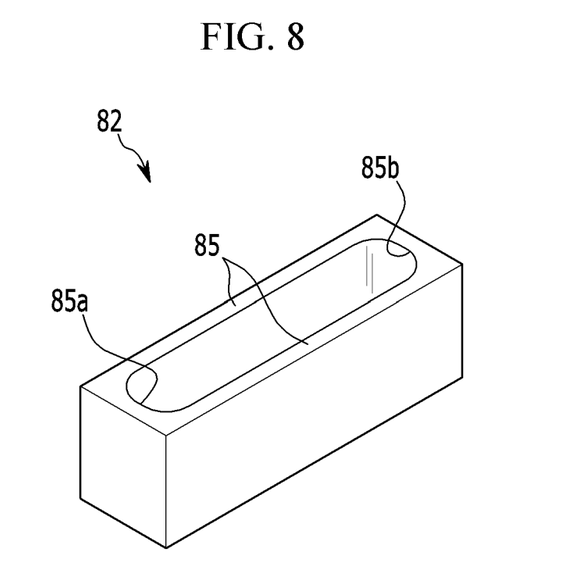
FIG. 8 is a perspective view illustrating a bottom case of the rechargeable battery according to the fifth exemplary embodiment.

FIG. 7 is a longitudinal cross-sectional view illustrating a portion of a rechargeable battery according to a fifth exemplary embodiment. FIG. 8 is a perspective view illustrating a bottom case of the rechargeable battery according to the fifth exemplary embodiment.

Referring to FIGS. 7 and 8, the rechargeable battery 105 according to the fifth exemplary embodiment is formed with substantially the same structure as that of the rechargeable battery according to the first exemplary embodiment, except for a case 80 and a first terminal 38, and thus descriptions of the structures that are substantially the same as the first embodiment will be omitted.

An electrode assembly 10 is inserted into the case 80 of the rechargeable battery 105 and a first terminal is bonded to a positive electrode uncoated region 11a of the electrode assembly 10. The case 80 includes a middle case or main body 81 that is formed to have a substantially cuboid shape and a bottom case 82 that is insertion into a lower portion of the middle case 81 to be connected thereto. In some embodiments, the bottom case 82 is connected to the middle case 81 via an interference fit. The middle case 81 is formed with a quadrangular pillar shape in which an upper portion and a lower portion are opened, a cap plate is connected to an upper end portion of the middle case 81, and the bottom case 82 is connected to a lower end portion of the middle case 81. An upper portion of the bottom case 82 is opened and the upper portion is inserted into a lower portion of the middle case 81. The bottom case 82 and the middle case 81 are bonded by welding.

The bottom case 82 has a bottom 83 and a support wall 85 that is connected to the bottom 83. Inner side surfaces 85a and 85b of the support wall 85 that oppose the side of the electrode assembly 10 are curved to have an arc shape that encloses a side surface of the electrode assembly 10. Accordingly, the electrode assembly 10 is stabilized at the inside of the case 80 to prevent the contact between the first terminal 38 and the electrode assembly 10 from becoming poor.

A hole 87 is formed at the bottom 83 of the bottom case 82 and the first terminal 38 is inserted into the hole 87. The hole 87 is formed to have a substantially quadrangular cross-section and an inner circumferential surface of the hole 87 is inclined with respect to the bottom 83 of the bottom case 82.

Figure 9:
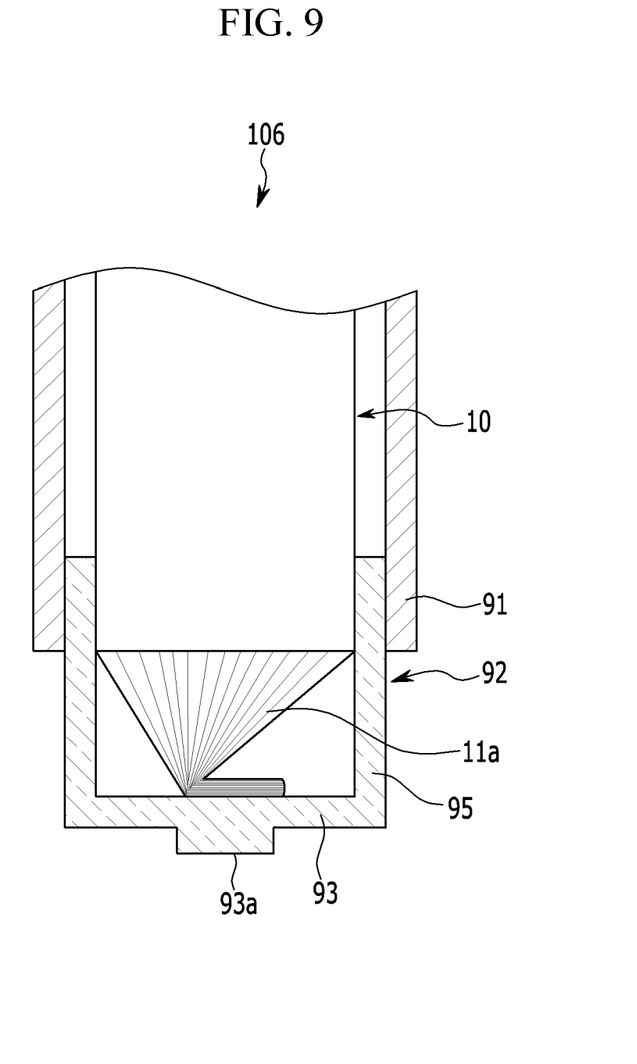
FIG. 9 is a longitudinal cross-sectional view illustrating a portion of a rechargeable battery according to a sixth exemplary embodiment.

FIG. 9 is a longitudinal cross-sectional view illustrating a portion of a rechargeable battery according to a sixth exemplary embodiment.

Referring to FIG. 9, the rechargeable battery 106 according to a sixth exemplary embodiment includes a case 91 and an electrode assembly 10 that is inserted into the case 91. The case 91 is formed to have a substantially cuboid shape having a substantially quadrangular cross-section. A cap plate is welded to an upper end portion of the case 91 and a first terminal 92 is welded to a lower end portion of the case 91.

The first terminal 92 includes a bottom 93 and a support wall 95 that is connected to the bottom 93. The first terminal 92 is inserted into a lower portion of the case 91 to be connected thereto. In some embodiments, the first terminal 92 is connected to the case 91 via an interference fit. The first terminal 92 is inserted into the case 91 and is welded so that the support wall 95 contacts an inner surface of the case 91. A positive electrode uncoated region 11a is welded at the bottom 93 of the first terminal 92 and thus the first terminal 92 and the case 91 are electrified with a positive charge. A terminal protrusion 93a is formed at the center of the bottom 93 protruding therefrom.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery, comprising:
an electrode assembly including a first electrode, a second electrode, and a separator interposed between the first electrode and the second electrode, the electrode assembly comprising a positive electrode uncoated region located at a lower end portion thereof and a negative electrode uncoated region located at an upper end portion thereof opposing the lower end portion, the positive electrode uncoated region including a tilt connection portion formed to be inclined to an external circumferential surface of the electrode assembly and a bonding portion bent at the tilt connection portion;
a case housing the electrode assembly, wherein the case defines a hole at a bottom of the case and an opening at a top of the case, the hole having a first end adjacent to an interior of the case and a second end adjacent to an exterior of the case, wherein the entirety of the bottom of the case is linear such that a depth of the hole is substantially the same as a thickness of the case;
a cap plate connected to the opening in the case;
a first terminal bonded, at an upper surface, to the first electrode and penetrating through the hole so as to protrude beyond the exterior of the case; and
a second terminal penetrating through the cap plate and electrically connected to the second electrode,
wherein an inner circumferential surface of the hole is inclined with respect to the bottom of the case and the width of the first end of the hole is greater than the width of the second end of the hole, wherein the first terminal is in direct physical contact with the inner circumferential surface of the hole, wherein the first terminal includes the upper surface and a lower surface opposing each other, wherein the lower surface of the first terminal is disposed outside the case, wherein the bonding portion of the positive electrode uncoated region is substantially parallel with the bottom of the case and covers a majority portion of the first end of the hole such that the upper surface of the first terminal is disposed within the hole and does not penetrate into the interior of the case, wherein an outer side surface of the first terminal is inclined with respect to the bottom of the case,
wherein the bottom of the case includes an upper surface facing the interior of the case and a lower surface facing the exterior of the case, wherein the upper surface of the first terminal is horizontally aligned with the upper surface of the bottom of the case, and
wherein each of the first terminal and the hole has a quadrangle transverse cross-section.

2. The rechargeable battery of claim 1, further comprising an insulating member interposed between the second terminal and the cap plate, wherein the second electrode comprises an uncoated region directly welded to the second terminal.

3. The rechargeable battery of claim 1, wherein the first electrode comprises a first electrode uncoated region and wherein the first terminal is directly bonded to the first electrode uncoated region.

4. The rechargeable battery of claim 3, wherein the first terminal is welded to a side surface of the first electrode uncoated region.

5. The rechargeable battery of claim 3, wherein the first terminal is welded to a lower end portion of the first electrode uncoated region.

6. The rechargeable battery of claim 1, wherein the case comprises a main body having a substantially cuboid shape and a bottom case connected to a lower portion of the main body, wherein the bottom case is connected to the main body via an interference fit and wherein the hole is formed in the bottom of the bottom case.

7. The rechargeable battery of claim 6, wherein an inner side surface of the bottom case is curved to have an arc shape enclosing a side surface of the electrode assembly.

8. The rechargeable battery of claim 1, wherein the hole is disposed at the center of the bottom of the case.

9. A rechargeable battery, comprising:
an electrode assembly including a first electrode, a second electrode, and a separator interposed between the first electrode and the second electrode, the electrode assembly comprising a positive electrode uncoated region located at a lower end portion thereof and a negative electrode uncoated region located at an upper end portion thereof opposing the lower end portion, the positive electrode uncoated region including a tilt connection portion formed to be inclined to an external circumferential surface of the electrode assembly and a bonding portion bent at the tilt connection portion;
a case housing the electrode assembly and having a substantially cuboid shape, wherein the case defines a hole at a bottom of the case, and an opening at one end thereof, the hole having a first end adjacent to an interior of the case and a second end adjacent to an exterior of the case, wherein the entirety of the bottom of the case is linear such that a depth of the hole is substantially the same as a thickness of the case;
a cap plate connected to the opening of the case;
a first terminal having a bottom, an upper surface, and a support wall connected to the bottom of the first terminal, wherein the support wall: i) is electrically connected to the first electrode at the first surface, ii) is connected to the case via an interference fit, and iii) contacts an inner side wall surface of the case; and
a second terminal penetrating through the cap plate,
wherein the first electrode comprises a first electrode uncoated region and wherein the bottom of the first terminal is directly bonded to the first electrode uncoated region,
wherein an inner circumferential surface of the hole is inclined with respect to the bottom of the case and the width of the first end of the hole is greater than the width of the second end of the hole, wherein the first terminal is in direct physical contact with the inner circumferential surface of the hole, wherein the first terminal includes the upper surface and a lower surface opposing each other, wherein the lower surface of the first terminal is disposed outside the case, wherein the bonding portion of the positive electrode uncoated region is substantially parallel with the bottom of the case and covers a majority portion of the first end of the hole such that the upper surface of the first terminal is disposed within the hole and does not penetrate into the interior of the case, wherein an outer side surface of the first terminal is inclined with respect to the bottom of the case, wherein the bottom of the first terminal comprises a terminal protrusion that protrudes from a center of the bottom of the first terminal, wherein the bottom of the case includes an upper surface facing the interior of the case and a lower surface facing the exterior of the case, wherein the upper surface of the first terminal is horizontally aligned with the upper surface of the bottom of the case, and wherein each of the first terminal and the hole has a quadrangle transverse cross-section.

\* \* \* \* \*